(12) United States Patent
Sun

(10) Patent No.: US 8,514,073 B2
(45) Date of Patent: Aug. 20, 2013

(54) AQUATIC PRODUCT TRANSPORTATION MONITORING SYSTEM AND METHOD THEREOF

(75) Inventor: Kuan-Hung Sun, Kaohsiung (TW)

(73) Assignee: Ding Li Tong Technology Co., Ltd., Kaohsiung (TW)

( * ) Notice: Subject to any disclaimer, the term of this patent is extended or adjusted under 35 U.S.C. 154(b) by 271 days.

(21) Appl. No.: 12/858,751

(22) Filed: Aug. 18, 2010

(65) Prior Publication Data

US 2011/0115625 A1 May 19, 2011

(30) Foreign Application Priority Data

Nov. 18, 2009  (TW) .............................. 98139173 A

(51) Int. Cl.
*G08B 21/00* (2006.01)
(52) U.S. Cl.
USPC ..................................... 340/540; 340/539.26

(58) Field of Classification Search
USPC ......... 340/539.1, 539.26, 540, 588; 374/102, 374/103
See application file for complete search history.

(56) References Cited

U.S. PATENT DOCUMENTS

| | | | |
|---|---|---|---|
| 7,760,084 B2 * | 7/2010 | Jensen et al. ............. | 340/539.26 |
| 8,099,130 B1 * | 1/2012 | Halla et al. ..................... | 455/561 |
| 2006/0145840 A1 * | 7/2006 | Klun ........................ | 340/539.22 |
| 2009/0099818 A1 * | 4/2009 | Kadaba ........................ | 702/184 |
| 2009/0273470 A1 * | 11/2009 | Sinkevicius et al. ..... | 340/539.26 |
| 2010/0265062 A1 * | 10/2010 | Ku ............................ | 340/539.26 |

\* cited by examiner

*Primary Examiner* — Kerri McNally
(74) *Attorney, Agent, or Firm* — WPAT, P.C.; Anthony King

(57) ABSTRACT

The present invention illustrates an aquatic product transport monitoring system and method thereof. The aquatic product transport monitoring system includes a test terminal and a control terminal. Also, the test terminal tests a liquid having at least one aquatic product held therein to obtain a test value. When the test value does not fall within a preset value range built in the control terminal, a warning signal is transmitted.

7 Claims, 3 Drawing Sheets

AQUATIC PRODUCT TRANSPORTATION MONITORING SYSTEM AND METHOD THEREOF

FIELD OF THE INVENTION

The present invention relates to a transportation monitoring system and method thereof, and more particularly to an aquatic product transportation monitoring system and method thereof.

BACKGROUND OF THE INVENTION

Following the economic development and the quick progress of the society, people now have higher and higher requirement on the quality of food. Thanks to the advancement in the aquatic product transportation technology, people can taste fresh seafood at any time without being limited to eat only the salted, sun-dried, or frozen fishes. Meanwhile, since the aquatic product transportation can be now achieved economically and efficiently, the rapid transportation also stimulates the development in the fishery.

The aquatic product transportation has close relation not only with different fish culturing or rearing businesses, such as fish hatchery, fish farm, and planned release of fishes, but also with international trade of aquatic products, local fish retail markets, aquariums, etc. It requires rich experiences and good skills to safely transport aquatic products to consumers. Currently available aquatic product transportation techniques are based on numerous times of failure and constantly accumulated experiences, particularly from the fish hatchery. For fully grown fishes, usually they can be directly sold to the market and may be sold out within only a few days. Full grown fishes with minor defects on fish skin or even with minor illness are still acceptable and may be sold so long as they can keep alive for several days. Unlike the grown fishes, fish fry require several months or even several years to culture after they have been transported to the fish farm. Any slight negligence at any small segment or any drastic change in the environmental factors during the transportation would lead to death of the fish fry so as to waste valuable time and cost spent on culturing the fish fry and the aquatic products.

SUMMARY OF THE INVENTION

An object of the present invention is to provide an aquatic product transportation monitoring system and method thereof, so as to solve the problem of death of aquatic products caused by unfavorable environmental factors during aquatic product transportation.

Another objects is providing an aquatic product transportation monitoring system according to the present invention. The aquatic product transportation monitoring system includes a test terminal and a control terminal. Further, the control terminal includes an alarm unit and a control unit. The test terminal tests different environmental factors in a liquid, generates test values corresponding to the tested environmental factors and transmits the test values to the control terminal. The control terminal compares each of the received test values with a corresponding preset value range. In the event the test values are higher or lower than the corresponding preset value ranges, the control unit controls the alarm unit to transmit a warning signal. On the other hand, when the test values fall within corresponding preset value ranges, no warning signal would be sent. Preferably, the preset value ranges represent the tolerabilities of the aquatic product(s) in the liquid, which correspond to the environmental factors.

To achieve the above and other objects, the aquatic product transport monitoring method according to the present invention includes the steps of (1) testing an environmental factor in a liquid and generating a test value; (2) testing a tolerance range of at least one aquatic product in the liquid; (3) comparing the test value with the tolerance range; and (4) determining whether the test value is higher or lower than the tolerance range, if yes, emitting a warning signal; if no, repeating the steps above.

The aquatic product transportation monitoring system and method thereof according to the present invention has one or more of the following advantages:

(1) The test terminal tests the quality of the liquid holding the transported aquatic product(s), and the control terminal automatically transmits the warning signal, thus, convenience in monitoring the environmental factors in the liquid can be enhanced.

(2) The test terminal tests the quality of the liquid holding the transported aquatic product(s) and the control terminal automatically transmits the warning signal, so that the problem of high death rate of the aquatic product(s) during transportation can be effectively solved.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
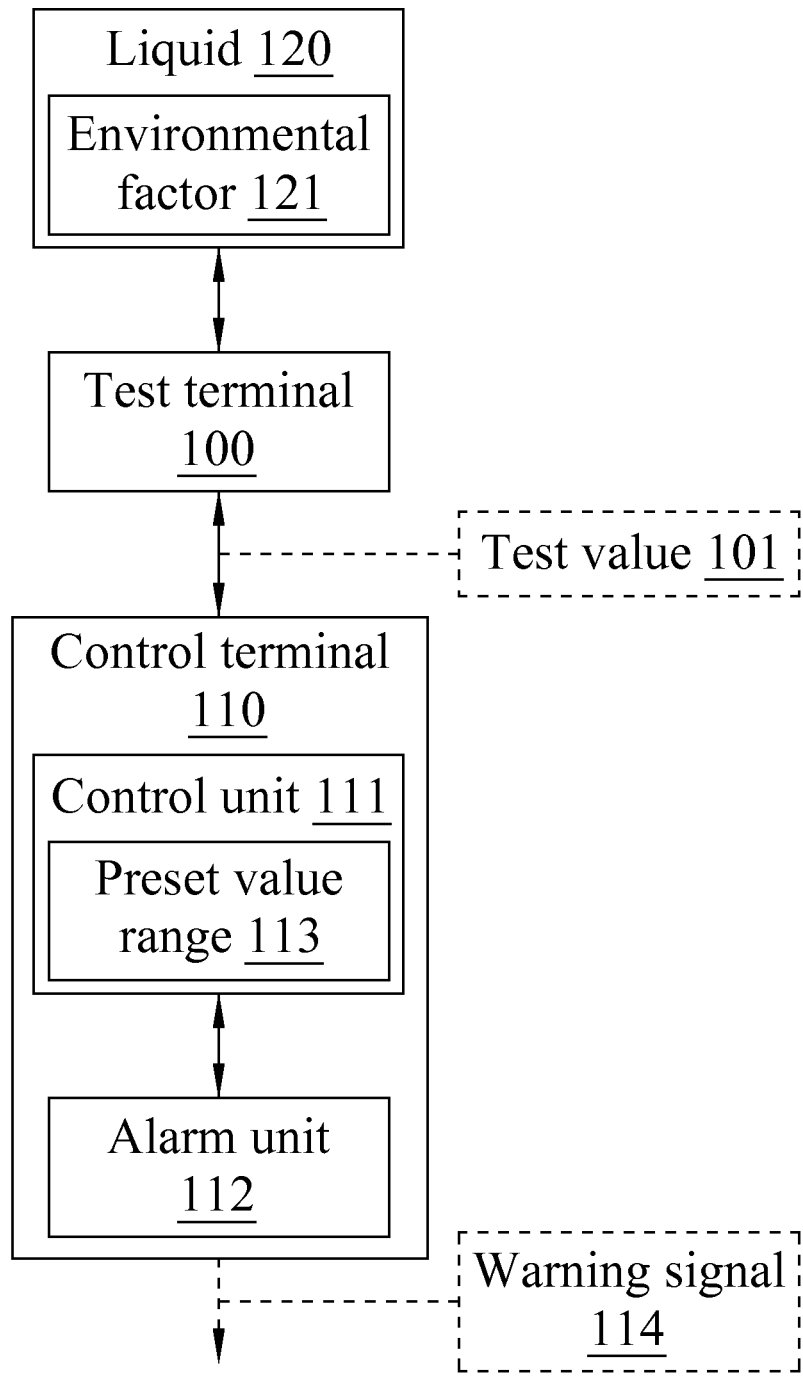
FIG. 1 is a block diagram of an aquatic product transportation monitoring system according to a first embodiment of the present invention.

Aquatic product transportation methods vary with the types and sizes of the transported aquatic products. Currently available aquatic product transport methods are mainly trying to control some physiological factors of the transported aquatic products, such as reducing the metabolic rate and the oxygen consumption of the transported aquatic products and relieving the transported aquatic products from a stressed state. Thus, to exactly control the aquatic product transport, it is necessary to fully understand the physiological state of the transported aquatic products. For example, live fish transportation can be generally divided into three types according to the transportation media thereof, namely, vehicle transport, ship transport, and air transport. Also, to save the water content of the transported aquatic products in order to reduce the transport cost, many new aquatic product transportation methods have been developed in recent years, including, for example, waterless transportation, cold hibernation transportation, acupuncture analgesia transportation, etc. No matter what type of transportation is adopted for transporting aquatic products, it is always important to understand the live fishes' physiological status, maintain the freshness of fishes, know how to stop feeding the fishes during transportation, control the water temperature, and protect the fishes against stress.

The present invention will now be described with some preferred embodiments thereof. For the purpose of easy to understand, elements that are the same in the preferred embodiments are denoted by the same reference numerals.

Please refer to FIG. 1 that is a block diagram of an aquatic product transportation monitoring system according to a first embodiment of the present invention. As shown, the aquatic product transportation monitoring system in the first embodiment includes a test terminal 100 and a control terminal 110. The test terminal 100 is used to test at least one environmental factor 121 in a liquid 120 stored in a water tank and having at least one type of aquatic product held therein. The test terminal 100 also transmits a test value 101 based on the tested environmental factor 121 to the control terminal 110. The control terminal 110 includes a control unit 111 and an alarm unit 112. The control unit 111 has a preset value range 113. When the control unit 111 receives the test value 101 from the test terminal 100, the test value 101 is compared with the preset value range 113. In the event the test value 101 does not fall within the preset value range 113, the control unit 111 controls the alarm unit 112 to transmit a warning signal 114, which may be a warning sound or a warning light or other display functions. Preferably, the preset value range 113 may be a tolerability of the aquatic product(s) in the water tank corresponds to the environmental factor 121.

Figure 2:
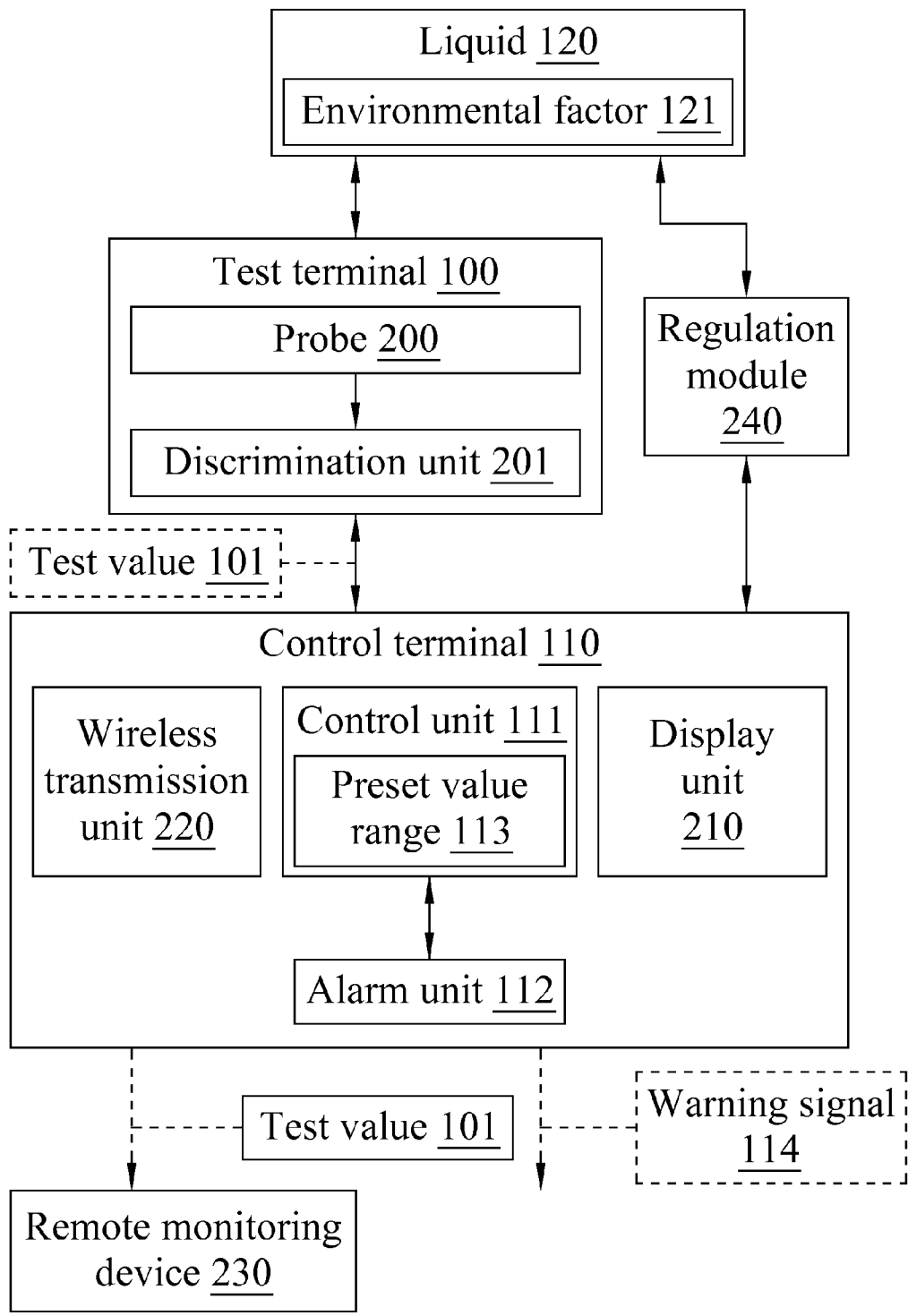
FIG. 2 is a block diagram of an aquatic product transportation monitoring system according to a second embodiment of the present invention.

Please refer to FIG. 2 that is a block diagram of an aquatic product transportation monitoring system according to a second embodiment of the present invention. As shown, the aquatic product transportation monitoring system in the second embodiment includes a test terminal 100 and a control terminal 110. The test terminal 100 is used to test a liquid 120 stored in a water tank having at least one type of aquatic product held therein. The test terminal 100 includes a probe 200 and a discrimination unit 201. Further, the probe 200 of the test terminal 100 is extended into the liquid 120 to detect at least one environmental factor 121 in the liquid 120 and transmits a test signal accordingly. Based on the test signal, the discrimination unit 201 generates a test value 101 representing the tested environmental factor 121 and transmits the test value 101 to the control terminal 110. Preferably, the environmental factor is the pH value, saltness, oxygen content, temperature, osmotic pressure, or turbidity of the liquid 120.

The control terminal 110 further includes a control unit 111 and an alarm unit 112. Moreover, the control unit 111 has a preset value range 113 and the preset value range 113 may be a tolerability of the aquatic product(s) in the water tank corresponding to the environmental factor 121. Besides, the preset value range 113 has at least one upper threshold value and at least one lower threshold value. The upper threshold value represents the highest limit of tolerance of the aquatic product(s) to the environmental factor 121, and the lower threshold value represents the lowest limit of tolerance of the aquatic product(s) to the liquid 120. When the control unit 111 receives the test value 101 from the test terminal 100, the test value 101 is compared with the preset value range 113. In the event the test value 101 does not fall within the preset value range 113, the control unit 111 controls the alarm unit 112 to transmit a warning signal 114, which can be a warning sound or a warning light or other display functions. The aquatic product transportation monitoring system in the second embodiment further includes a regulation module 240. A user may control the regulation module 240 via the control terminal 110 to adjust the environmental factor 121 in the liquid 120, so that the environmental factor 121 in the liquid 120 is suitable for the aquatic product(s) to live in the liquid 120. For example, the regulation module 240 may be controlled to filter the liquid 120 or to balance the pH of the liquid 120.

Meanwhile, the control terminal 110 may further include a wireless transmission unit 220 for transmitting the test value 101 and any comparison result to a remote monitoring device 230. The control terminal may 110 also include a display unit 210, on which the test value 101 obtained at the test terminal 100 can be displayed for the reference of persons monitoring the aquatic product transportation, so that these persons can determine whether to actively adjust the environmental factor 121 in the liquid 120 accordingly.

Figure 3:
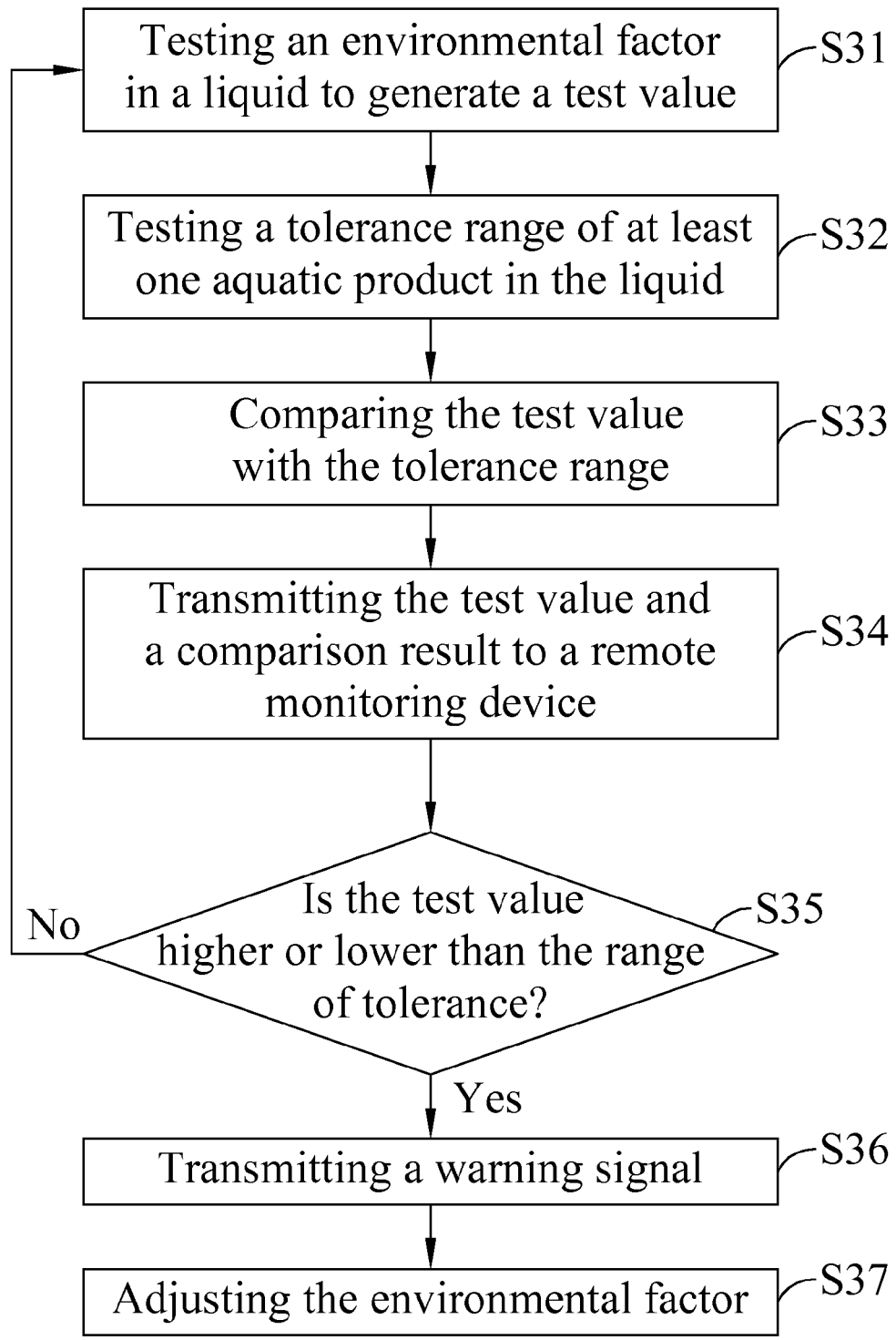
FIG. 3 is a flowchart showing the steps included in an aquatic product transportation monitoring method according to the present invention.

FIG. 3 is a flowchart showing the steps included in an aquatic product transportation monitoring method according to the present invention. As shown, the aquatic product transportation monitoring method includes a step S31 illustrates that a test module is used to test an environmental factor in a liquid, in order to generate a test value; a step S32 illustrates that a test module is used to test a tolerance range of at least one aquatic product in the liquid; a step 33 illustrates that the test value obtained in the step S31 is compared with the tolerance range; a step S34 illustrates that the test value and any comparison result thereof are transmitted to a remote monitoring device; a step S35 illustrates that it is determined whether the test value is higher or lower than the tolerance range; if yes, go to step 36, and if no, go back to step 31; a step S36 illustrates that a warning signal is transmitted to a transporter to remind the transporter that the current environmental factor in the liquid might cause death of the aquatic product(s) in the liquid on the way of transportation; and a step S37 illustrates that the environmental factor in the liquid is adjusted to fall within the tolerance range, so that the aquatic product(s) is (are) protected against death during transportation.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An aquatic product transportation monitoring system, comprising:
    a test terminal testing at least one environmental factor in a liquid and transmitting a test value corresponding to the at least one environmental factor;
    a control terminal comprising:
        an alarm unit;
        a display unit displaying the test value; and
        a control unit comprising at least one preset value range and determining whether the test value falls within the at least one preset value range; and the control unit controlling the alarm unit to emit a warning signal when the test value deviates from the at least one preset value range;
        wherein each of the at least one preset value range corresponds to a tolerability of at least one aquatic product to the at least one environmental factor;
    a regulation module adjusting the environmental factor by either the control terminal or an user such that if the test value deviates from the preset value range, the user is enabled to actively adjust the environmental factor by referring to the test value displayed by the display unit.

2. The aquatic product transportation monitoring system as claimed in claim 1, wherein the environmental factor is selected from the group consisting of pH value, saltness, oxygen content, temperature, osmotic pressure, and opacity of the liquid.

3. The aquatic product transportation monitoring system as claimed in claim 1, wherein the control terminal further comprises a wireless transmission unit transmitting the test value and a result to a remote monitoring device; the result is from comparing the test value with the preset value range.

4. The aquatic product transportation monitoring system as claimed in claim 1, wherein the test terminal comprises:
   a probe contacting with the liquid to generate a sensing signal based on the environmental factor; and
   a discrimination unit discriminating the sensing signal and generating the test value accordingly.

5. An aquatic product transportation monitoring method, comprising the steps of:
   testing at least one environmental factor in a liquid and generating a test value;
   testing a tolerance range of at least one aquatic product in the liquid;
   comparing the test value with the tolerance range;
   determining whether the test value is higher or lower than the tolerance range; if yes, transmitting a warning signal accordingly; and
   adjusting the environmental factor and adjusting the test value to be in accordance with the environmental factor to fall within the tolerance range such that if the test value deviates from a preset value range, an user is enabled to actively adjust the environmental factor by referring to the test value.

6. The aquatic product transportation monitoring method as claimed in claim 5, further comprising a step of transmitting the test value and a result to a remote monitoring device; the result obtained by comparing the test value with the tolerance range.

7. The aquatic product transportation monitoring method as claimed in claim 5, wherein the environmental factor is selected from the group consisting of pH value, saltness, oxygen content, temperature, osmotic pressure, and opacity of the liquid.

* * * * *